May 19, 1964 D. HENDRIX 3,133,380
CUSHION BUFFING MACHINE
Filed Oct. 26, 1961 4 Sheets-Sheet 1

INVENTOR.
Dewey Hendrix
BY
ATTORNEY

INVENTOR.
Dewey Hendrix
BY
ATTORNEY

INVENTOR.
Dewey Hendrix

INVENTOR.
Dewey Hendrix

3,133,380
CUSHION BUFFING MACHINE
Dewey Hendrix, 1306 Salem Road, Morganton, N.C.
Filed Oct. 26, 1961, Ser. No. 147,877
6 Claims. (Cl. 51—32)

The present invention relates to a buffing machine for automatically buffing cushions, pads, mattresses and other articles. More particularly, this invention contemplates an apparatus for buffing, rounding and trimming a pair of opposed surface edges of cut sheets to be formed into cushions, pads, pillows, pattresses and the like made from foams of urethane, rubber or comparable materials.

In the fabrication of cushions, mattresses and pads, as well as other articles employed for cushioning and seating, it has been conventional practice to employ foam rubber in which the configuration has been achieved by foaming the rubber in place within molds of the requisite end configuration. Also, with the increased use of urethane as a cushioning and mattress material, foamed-in-place urethane has been employed substantially in the same manner as the foamed-in-place rubber. With the ever increasing demand for urethane cushions and other articles, it has been found that urethane and rubber may be buffed manually to achieve the desired configuration after the sheet or plank of material has been cut from a large "bun." The sheets and planks cut from the urethane bun have right angle edges or corners on opposed surfaces which edges and corners are objectionable as they offer a minimum of strength and cushioning resistance in addition to the attendant difficulties in the application of a suitable upholstery material that tends to crush or wrinkle the corners of the urethane. Power-driven buffing tools are generally employed by manually displacing the buffing wheel transversely along only one of the edges at a time to remove the edge and provide the desired radius of curvature or rounded corner along and about the perimeter of one or both surfaces of the cushion or other article. This procedure is not only costly and time consuming but requires considerable skill in the manipulation of the power tool for buffing.

It is desirable to have both surfaces of the cushion present substantially the same curvature or rounded edges and to have the cushion present a crown-appearance at the center of the cushion, in some forms, rather than a flat plane surface. Heated wires, blades, buffing wheels and discs have all been employed in an attempt to achieve the desired rounded configuration to the cushions and other like articles.

Therefore, it is an objective of this invention to provide a buffing apparatus for cushions, pads, mattresses and like articles that is capable of simultaneously buffing a rounded edge on one or a pair of opposed edges of a square or rectangularly-shaped sheet or plank of integral material, preferably urethane.

Another objective of this invention is to provide a buffing machine for grinding a rounded edge or radius of curvature on the perimeter or perimeters of opposed surfaces of a cushion, pad, pillow or mattress.

Still another objective of this invention is the provision of a buffing apparatus in which a pair of rotatable, longitudinally-extending drums are provided with a buffing surface for simultaneously buffing a pair of opposed edges of a cushion or like article to produce a rounded edge of the desired curvature.

A further object of this invention is to provide a buffing machine in which a pair of opposed edges of a cushion may be rounded simultaneously and automatically without the necessity for employing a skilled operator and for obtaining uniformity between all rounded edges of a cushion and other cushions which may complement each other.

Other objects and many of the attendant advantages of this invention with respect to grinding and buffing cushions and like articles will become more readily apparent to those skilled in this art from the following detailed description taken in conjunction with the accompanying drawings in which like characters of reference designate corresponding parts throughout the several views, and wherein.

Figure 1:
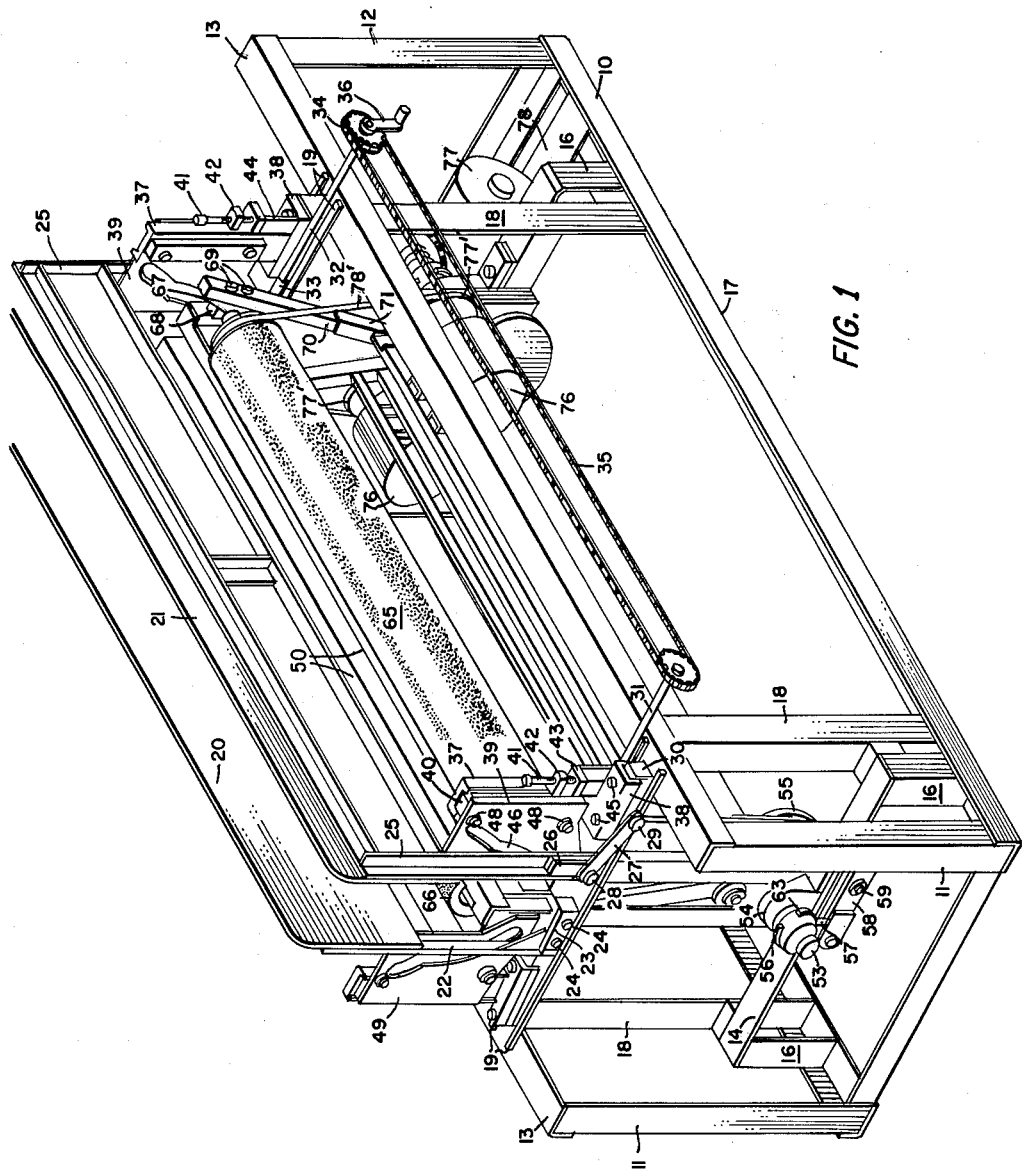
FIG. 1 is a front perspective view of the cushion buffing apparatus of this invention illustrating, in outline form, a cushion positioned in place prior to buffing.
Figure 2:
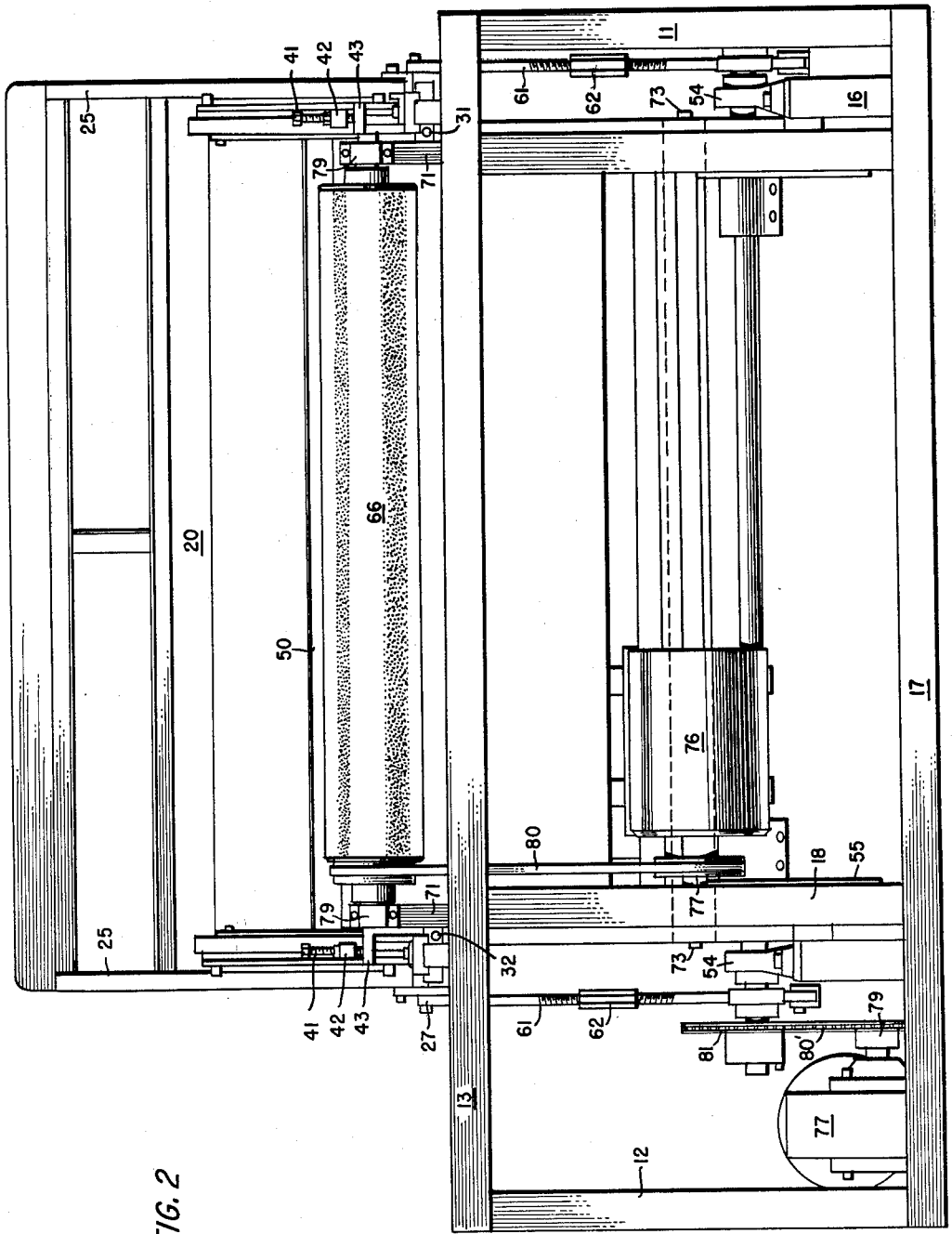
FIG. 2 is a front elevational view of the buffing apparatus of FIG. 1 with the buffing drums in their lowered position, similar to the showing in FIG. 1.
Figure 3:
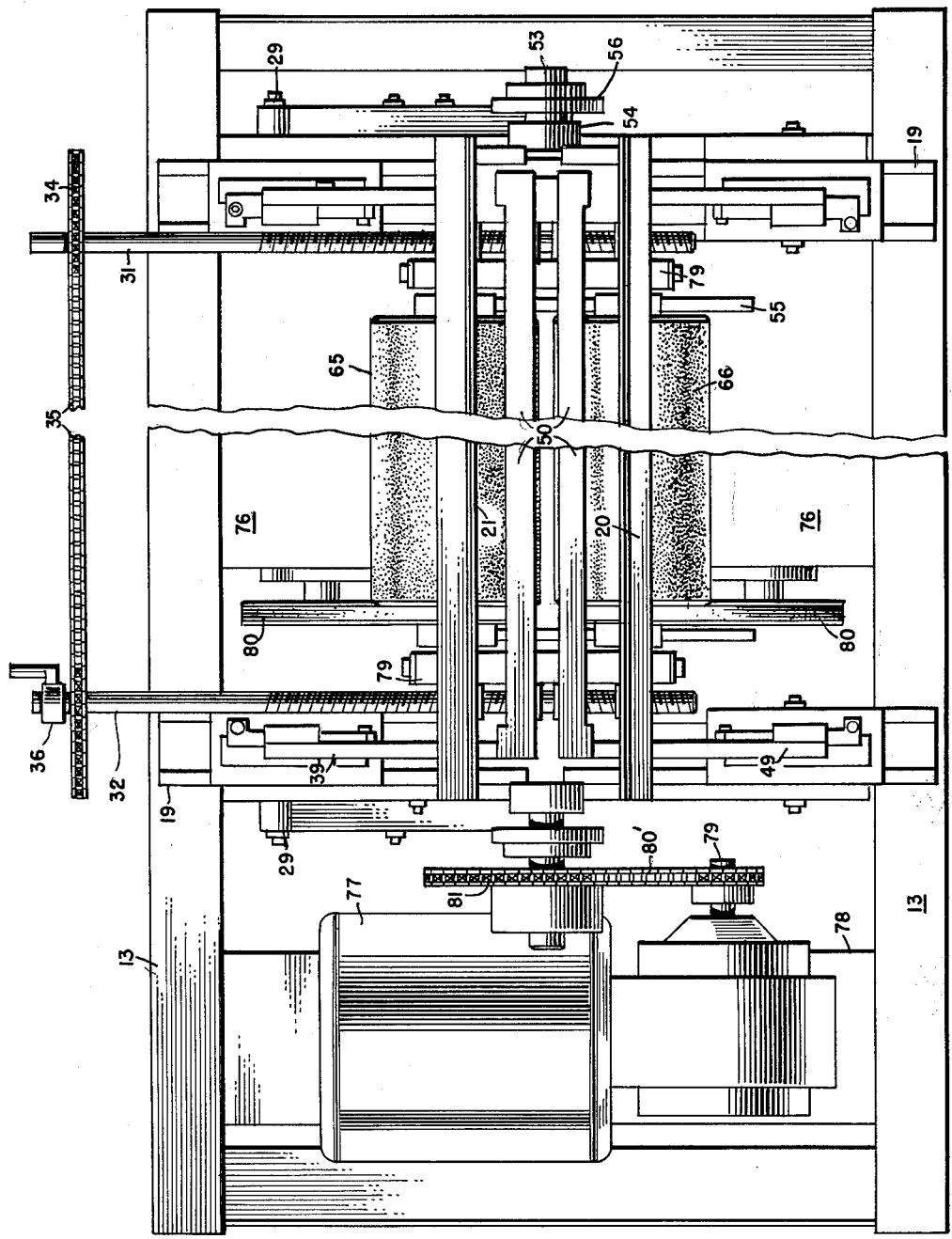
FIG. 3 is a top plan view of FIG. 2.

Referring now to the drawings, the base 10 of the buffing apparatus is formed from angle iron with the spaced apart corner members 11 and 12 on each of the front and rear frame sections supporting top rail 13 which top rails 13 extend longitudinally on the front and rear of the machine. Intermediate pillar-block frames 14 and 15 extend between the front and rear sections beneath the longitudinally-extending rails on the vertical short legs 16 which are secured as by welding to the transversely extending base rails 17. Intermediate and vertically extending legs 18, secured to the base rail 17, and the upper rail 13, reinforce the reach between the legs 11 and 12 on the front and rear sections.

A pair of laterally spaced guide rails 19 reach transversely between the upper rails 13 and are secured thereto for guidably supporting and releasably locking thereon a pair of longitudinally-extending cushion guide and supporting walls or fences 20 and 21. The rear fence 20 is provided with downwardly depending legs 22 which are received and locked to the movable supporting block 23 that is mounted on one of the rails 19. A similar mounting for the other end of the fence is provided for the depending leg that supports the fence 20. Clamping screws 24 releasably lock the block 23 on the rail and may be adjusted along the rail to the desired position. The front fence 21 is also provided with depending legs 25 which extend downwardly to be received on the vertical block 26 which in turn is attached to the pivotable link 27 through the shaft 28 with the forwardmost end of the link 27 being pivotally connected through the stub shaft 29 to the block 30 that is releasably clamped between the rails 19. The space between the fences 20 and 21 may be adjusted readily to accommodate a cushion of the requisite thickness between the plates by clamping the depending legs 22 and 25, in their respective blocks, along the guide rails 19 at the desired location. In the embodiment illustrated in FIG. 1, forwardly projecting threaded shafts 31 and 32 are connected to and threadably engage with the sleeves 33. Chain sprockets 34 are keyed to each of the shafts 31 and 32 and receive a continuous chain 35. Rotation of the hand wheel 36 mounted on either of the shafts 31 or 32 will revolve the other shaft through travel of the chain 35 for displacing the fence 21 the desired distance from the fence 20.

A pair of vertical cam guide rails 37 is mounted on the supporting block 38 above the block 30 and secured thereto. A cam plate 39 is secured to the cooperating slidable gib 40 that is vertically movable within the rail 37 by means of the elevating screw 41 mounted on the movable gib 40 through the lug 42 with the screw 41 engaging the shoulder 43 that is stationarily mounted on the vertical pedestal 44 adjacent to the cam plate 39. The cam plate 39 and the vertical rail 37 may be adjusted horizontally on the block 30 to the desired position and locked in place by means of the bolts 45.

Figure 4:
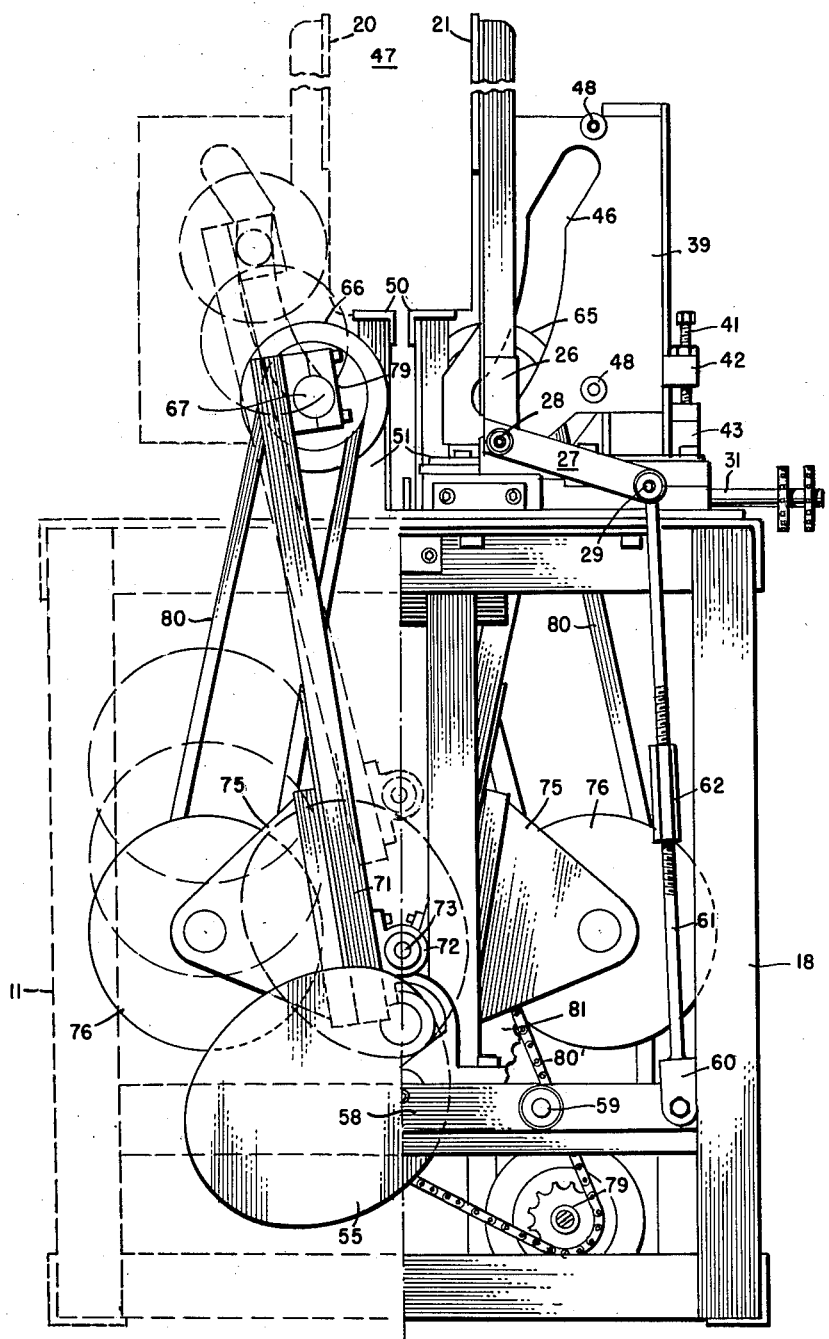
FIG. 4 is a somewhat enlarged end elevational view of the buffing apparatus illustrating, in full line, the initial drum position, and illustrating, in outline form, on the left side of the view, the sequential steps in the elevation of the left drum or roller for buffing one edge of a cushion supported between the buffing drums.

Cam plate 39 has a cam opening 46 of a predetermined contour corresponding to a desired radius of curvature to be ground or buffed in a cushion to be retained between the fences 21 and 22 as is more clearly shown in FIG. 4 wherein the cushion 47 is releasably clamped between the cushion supporting members 20 and 21. The cam plate 39 is retained on the gib 40 through the bolts 48 and may be replaced readily for a cam plate of a different arcuate opening. In the embodiment illustrated in FIGS. 1 and 4, the cam plates on the forward side of the apparatus are of the same configuration as that which appears on the rear side of the machine to produce a similar radius of curvature or rounded corner on the cushion to be buffed. The rear cam guide plates 49 are supported by the same structural elements as appear on the front section of the buffing apparatus.

A pair of laterally spaced apart angle irons 50 extend longitudinally between the vertically extending and longitudinally extending fences 20 and 21 and are supported from the framework by the vertical members 51 which are secured thereto. The members 50 serve as a cushion stop and rest for positioning the cushion prior to buffing.

A drive shaft 53 extends longitudinally of and through the bearing blocks 54 mounted on each of the cross-rail members 14. An eccentric elevating cam 55 is mounted in axial-spaced relation on the shaft 53 inwardly of the bearing blocks 54. On the outside terminal ends of the shaft 53, beyond the pillow block bearings 54, is a fence-actuating cam 56 for cooperative engagement with the cam roller 57 mounted on the rocker arm 58 that is pivotally connected on the stud 59 that is stationarily supported on the cross-rail 14. The lower yoke-end 60 of the articulated link 61 on which there is threadably secured the turn buckle 62 for adjusting the length of the link 61 is secured to the other end of the link 58 to impart pivotable movement to the fence 21 about the pivot point 28. Upon rotation of the shaft 53, the cam 56 will initially, to receive a cushion between fences, be introduced into the cam recess 63 pivoting the link 58 clockwise to pivot the fence 21 clockwise. As the shaft 53 revolves further, the cam roller 57 will engage the high part of the cam 56 to pivot the link 58 counterclockwise thereby closing or pivoting the fence 21 counterclockwise to support a cushion on the stops 50 prior to buffing while the cushion remains in a vertical position. Link 27 is secured to the block 26 on the depending leg 25 of the fence 21 so that rotation of the link 27 upon actuation from link 61 will enable the fence to respond thereto. A similar fence actuating linkage is mounted on the other end of the apparatus to actuate fence 21 in the manner above described as the cams 56 are keyed on the shaft in the same manner.

A pair of longitudinally-extending drums 65 and 66 are supported in parallel relationship to each other and each is provided with an abrasive surface of suitable grit or compound depending upon the surface of the material to be buffed or ground. It has been found satisfactory to wrap the drums 65 and 66 with a helically-wound strip of sandpaper, of the desired coarseness, for the desired material to be buffed. Obviously, a grinding wheel or other abrasive fabrics may be employed on each of the drums as the grinding or abrasive surface thereof.

The terminal ends of the drums 65 are provided with stub shafts 67 which are cooperatively received in split bearing blocks 68 that are retained by means of the bolts 69 on the movable drum supporting arms 70 that are cooperatively received and guidably retained in the pivotally mounted arm-receiving sockets 71. The socket and motor frame 71, and its corresponding counterpart on the other side or section of the machine, is connected to pillow bearing block 72, which bearing block is supported on the lift shaft 73 that extends longitudinally of the machine to receive thereon the motor mounting frames 75 that are directly supported on the frames 71. The motor-supporting plates 75 will support the motors 76 thereon.

A gear motor 77 is mounted on the base plate 78 and drives the sprocket 79 over which the chain 80 is trained. Sprocket 81 mounted on the end of the main drive shaft 53 is driven by the chain 80 and in turn revolves the main shaft 53 with the eccentric lift or elevating cams 55 thereon. Upon rotation of the main shaft 53, the lifting cams 55 will rotate therewith and be in engagement with the lift shaft 73. As the lift shaft is elevated vertically by the elevating cam 55, the motors 76 will similarly be lifted and the arms 70 will be elevated to raise the drums vertically which drums will be guided in their movement through the arcuate path described by the cam plate openings 46 in each of the cam plates 39. The flexible connector belts 78' which encircle the motor pulleys 77' and the drum pulleys 79 will revolve the drums throughout their arcuate path upwardly.

The drums 65 and 66 will rotate continuously during operation and as the drums are elevated vertically upon rotation of the lifting cams 55, the arcuate path described will position the drums in contact with the opposed edges of the cushion 47 which rests on the stops 50 between the fences 20 and 21 with the arcuate path described by each of the drums that are maintained in parallel relationship rounding off the corners 80 of the cushion. The speed of the machine may be controlled so as to permit the rollers to descend before releasing the fence 21 to permit rotation of the cushion for the next buffing operation on another pair of opposed edges of the cushion.

*Operation*

In the operation of the buffing apparatus, for automatic operation, the front fence 21 is pivoted forwardly as the main shaft rotates the cam 56 to a position permitting the roller 57 to drop within the recess 63 thereby pivoting the link 58 clockwise and opening the fence to receive a cushion on end to rest on the cushion stops 50. As the shaft continues to revolve through the gear motor 77, the fence 21 will releasably clamp the cushion 47 in position. The elevating cam 55 on the main shaft will elevate the lifting shaft 73 on which the motor and motor mounts 76 and 75 are supported. As the lifting shaft, motor and motor mounts are elevated, the revolving drums 65 and 66 will describe an arcuate path vertically as controlled by the arcuate recesses 46 in the cam plates 39 describing the arcuate path that will correspond to the radius of curvature to be buffed into the edges of the cushion 47. Upon completion of the buffing cycle, the fence 21 will be opened permitting the cushion to be revolved to present another pair of opposed edges to the buffing drums.

Obviously many modifications and variations may be made to the linkages supporting the motors for driving the cylindrical buffing drums and the means for actuating the buffing drums, and the cam guide plates may be modified for guiding the movement of the buffing drums without departing from the spirit and purpose of this invention in which many modifications and mechanical equivalents are contemplated.

What is claimed is:

1. A cushion buffing apparatus comprising a framework, a pair of spaced-apart cushion guides for supporting a cushion along an end thereof, at least one of said guides being releasably mounted on said framework for displacement relative to the other guide, a cushion stop mounted between the cushion supporting guides for positioning a cushion end thereon, a pair of longitudinally-extending drums having an abrasive cylindrical surface for engaging the edge of a cushion mounted on the said cushion stop, each of said drums being supported for rotation from said framework parallel to and in juxtaposition with each cushion supporting guide, each of said drums having an axially extending shaft the terminal ends of which extend beyond the drum, cam guide plates mounted on the framework for cooperatively receiving the terminal ends of said shaft, each of said plates having an arcuate cam opening therein for guiding the roller shaft with the drum thereon in a prescribed path of travel, means for revolving each of said drums, means driven by said drum revolving means for displacing said drums in said cam guide plates whereby the drums will diverge from each other upon vertical displacement to buff edges of a cushion supported on the cushion stop between the guide members.

2. A cushion buffing machine comprising a framework, means for releasably supporting a cushion of urethane in a vertical plane mounted on the framework, a cushion stop mounted between the cushion supporting means for positioning an end of a cushion thereon, a pair of longitudinally-extending spaced-apart rollers having an abrasive cylindrical surface for engaging cushion edges of a cushion mounted on said cushion stop, each of said rollers being supported from said framework in juxtaposition to said cushion supporting means, cam guide plates mounted on the framework for cooperatively receiving and guiding each of said rollers in a prescribed path of travel, electric motor drive means for revolving each of said rollers, means for displacing said rollers in said cam guide plates whereby the rollers will diverge from each other during upward displacement to buff the edges of a cushion supported on the cushion stop between the cushion supporting means and will converge on downward return.

3. A cushion buffing apparatus comprising a framework, cushion supporting guides on the framework for releasably clamping a cushion in upright position on the end thereof, means for limiting vertical displacement of said cushion between said cushion supporting guides, a longitudinally-extending roller having an abrasive cylindrical surface for engaging an edge of a cushion supported between the cushion guides, said roller being supported from said framework parallel to and in juxtaposition with a cushion supporting guide, said roller having an axially extending shaft the terminal ends of which extend beyond the roller, cam guide plates mounted on the framework for cooperatively receiving the terminal ends of said shaft, each of said plates having an arcuate cam opening therein for guiding the roller shaft in a prescribed path of travel, means for revolving each of said rollers, means for vertically reciprocating said roller in said cam guide plates whereby the roller will describe an arcuate path of travel to buff a rounded edge on the cushion supported between the cushion supporting guides.

4. A buffing apparatus for cushions, pads and mattresses of urethane comprising a framework, a pair of spaced-apart cushion supporting guides releasably mounted on said framework for displacement relative to each other and clamping engagement with a cushion, a cushion stop mounted on the framework between the cushion supporting guides for positioning a cushion thereon in an upright position, a pair of longitudinally-extending drums having an abrasive cylindrical surface for engaging opposed cushion edges rotatably mounted on the framework, each of said drums being supported from said framework parallel to and in juxtaposition with each cushion supporting guide, drum guide means on said framework for cooperatively receiving and guiding said drums in an arcuate path corresponding to the curvature to be buffed on the cushion edges, and means for revolving each of said drums, means for urging said drums for displacement in an arcuate path to engage and buff opposing cushion edges.

5. A buffing apparatus comprising a framework, means on the framework for supporting and releasably clamping a cushion in an upright position, a cushion stop mounted between the cushion supporting and clamping means, a pair of longitudinally-extending spaced-apart revolvable drums having an abrasive cylindrical surface for engaging a pair of opposed cushion edges of a cushion mounted on said cushion stop, said drums being supported from said framework parallel to and in juxtaposition with said cushion supporting means, drum guide means mounted on the framework for cooperatively receiving and guiding each of said drums in an arcuate path corresponding to the radius of curvature to be buffed on the cushion edges, means for revolving each of said drums, means for elevating and lowering said drums during rotation for buffing engagement with cushion edges whereby the drums will diverge from each other in one direction of buffing and converge in an opposite direction.

6. A cushion buffing apparatus comprising a framework, a pair of laterally spaced-apart and longitudinally-extending cushion guide members on said framework, one of said cushion guide members being movable laterally away from the other guide member to receive and support a cushion on end therebetween to expose the edges thereof during buffing, guide means on the framework for supporting said guide members, a longitudinally-extending drum having a cushion-buffing surface thereon cooperatively mounted and in juxtaposition to at least one of said cushion guide members, drum cam guide and supporting means mounted on the framework to control the path of roller travel in an arcuate vertical path corresponding to the curvature to be buffed on a cushion edge, means for rotating said drum, means for displacing said drum in an arcuate path formed by said drum cam guide and supporting means whereby the drum will engage and buff a radius on a cushion edge.

References Cited in the file of this patent
UNITED STATES PATENTS

| | | |
|---|---|---|
| 531,368 | Fifield | Dec. 25, 1894 |
| 1,440,386 | Hawes | Jan. 2, 1923 |
| 1,442,337 | Hannaford | Jan. 16, 1923 |
| 2,304,580 | Luers | Dec. 8, 1942 |
| 2,712,840 | Gilbertson | July 12, 1955 |
| 2,722,087 | Hamilton | Nov. 1, 1955 |
| 2,741,070 | Muehling | Apr. 10, 1956 |
| 2,766,563 | Bennett | Oct. 16, 1956 |
| 2,922,264 | Mushrush | Jan. 26, 1960 |
| 2,930,163 | Barker et al. | Mar. 29, 1960 |

FOREIGN PATENTS

| | | |
|---|---|---|
| 421,377 | Germany | Nov. 11, 1925 |